United States Patent [19]

Beck

[11] 4,393,901
[45] Jul. 19, 1983

[54] LOW-PERMEABILITY HOLLOW SPHERES AND PIPE FILLED WITH THE SPHERES FOR TEMPORARY WEIGHT REDUCTION

[75] Inventor: Warren R. Beck, Saint Paul, Minn.

[73] Assignee: Minnesota Mining and Manufacturing Company, Saint Paul, Minn.

[21] Appl. No.: 399,455

[22] Filed: Jul. 19, 1982

Related U.S. Application Data

[63] Continuation of Ser. No. 190,718, Sep. 24, 1980, abandoned.

[51] Int. Cl.³ .................. C04B 31/04; F16L 1/04; F16L 9/08
[52] U.S. Cl. .................. 138/145; 106/288 B; 138/177; 138/DIG. 9; 405/171
[58] Field of Search ........ 138/140, 145, 177, DIG. 9, 138/103; 405/158, 168, 169, 170, 171, 172, 173, 45; 428/36, 312.4, 313.9, 315.5, 315.7, 406; 239/547; 106/288 B

[56] References Cited

U.S. PATENT DOCUMENTS

| 2,991,808 | 7/1961 | Siegmann et al. | 138/177 X |
| 3,561,494 | 2/1971 | Hackett | 138/177 |
| 3,864,443 | 2/1975 | Hopkins | 106/288 B X |
| 3,935,632 | 2/1976 | Maxson | 138/DIG. 9 |
| 4,111,713 | 9/1978 | Beck | 106/288 B |
| 4,159,189 | 6/1979 | Todd et al. | 405/171 X |

*Primary Examiner*—Stephen Marcus
*Assistant Examiner*—Mark John Thronson
*Attorney, Agent, or Firm*—C. Alexander; D. M. Sell; R. R. Tamte

[57] ABSTRACT

Pipe adapted to be installed underwater at increased ocean depths by practical pipe-laying procedures comprises a porous cement shell filled with hollow spheres that are slowly permeable to water under pressure. The cement shell is filled with a sufficient volume of the hollow spheres to make the pipe only slightly heavier than sea water, providing a reduced weight that overcomes previous difficulties in laying pipe at great depths. Over a period of time after the pipe has been installed underwater, the hollow spheres gradually fill with water and make the pipe rest stably on the ocean bottom. The preferred spheres comprise porous core spheres coated with thin coatings that partially seal the spheres to the needed degree of permeability.

7 Claims, 3 Drawing Figures

LOW-PERMEABILITY HOLLOW SPHERES AND PIPE FILLED WITH THE SPHERES FOR TEMPORARY WEIGHT REDUCTION

This is a continuation of application Ser. No. 190,718 filed Sept. 24, 1980, now abandoned.

BACKGROUND OF THE INVENTION

Several years ago the American Gas Association began funding work intended to develop an improved method for laying gas pipelines on ocean bottoms. The existing method involved adding sections of pipe to an end of the pipeline that was supported on a barge floating on the ocean surface. The pipe sections comprised a metal core pipe covered with cement to make the pipe heavier than water, and the completed portion of the pipeline slanted from the barge down to the ocean bottom, with the trailing portion resting on the ocean bottom.

This method worked acceptably for laying pipelines at depths up to 500 feet. But at the greater depths contemplated in pursuit of added gas supplies, the increased length and weight of pipe from barge to ocean bottom could buckle or bend the pipe. Also, the increased weight of pipe would be a major obstacle in the event that defects or a storm required recovering the pipe.

The funding by the Gas Association led to a suggestion that the cement layer covering the pipe sections be filled with porous hollow spheres coated with a water-soluble coating. The coated hollow spheres would initially reduce the weight of the pipe; but after the pipe had been submerged for a week or so, water permeating into the cement would dissolve the coating on the spheres and fill the spheres, thereby weighing down the pipe to make it rest stably on the ocean bottom.

This approach apparently proved to be unworkable because it was not possible to accurately control the exposure of the water-soluble coating to water. Such exposure occurred when the coated spheres were mixed into wet cement, and also during storage, when rain and moisture in the air permeated into the cement. The exposure caused premature dissolving of the coating, causing variable and unpredictable performance by the pipe. In the end the approach of water-soluble-coated spheres was abandoned, leaving no practical method for laying pipeline at greater ocean depths.

SUMMARY OF THE INVENTION

The present invention provides new porous hollow spheres which make possible a reliable and effective new pipe-laying method. These new hollow spheres are made with a low and controlled permeability, which allows only a slow intake of water even under the pressures at ocean bottom. Initially pipe sections having a cement shell filled with the spheres will have a reduced weight (generally their initial density will be slightly greater than the specific gravity of water, so that the pipe sections become submerged when deployed from a barge but still can be easily raised if a need arises). However, as the spheres gradually take on water over a week or two, the pipeline becomes heavy enough to rest stably on the ocean bottom.

The hollow spheres of the invention are designed to be permeable at pressures at which they are expected to be used, which for almost all uses, is a pressure of 10 kilograms per square centimeter or more. The preferred hollow spheres comprise a porous hollow core sphere such as taught in Beck, U.S. Pat. No. 4,111,713 carrying a thin coating that seals some pores but leaves the coated sphere permeable to water at a predetermined pressure and ocean depth. The exterior wall of the patented core spheres comprises binder material filled with particles such as hollow microspheres, and pores develop in interstices between the particles that are not wholly filled with binder material. The spheres can be made with a porosity greater than that needed for use in this invention, but when coated with thin coatings of polymeric-based material are found to achieve the needed permeability.

The permeability of the spheres of the invention is stable, and pipe sections filled with the spheres have a predictable weight and a predictable increase in weight over time when introduced into water. The spheres can be conveniently introduced into wet cement that is to be applied to a core pipe, thereby producing pipe sections that can be practicably laid at ocean depths far greater than the presently common levels of 500 feet.

DETAILED DESCRIPTION

Figure 1:
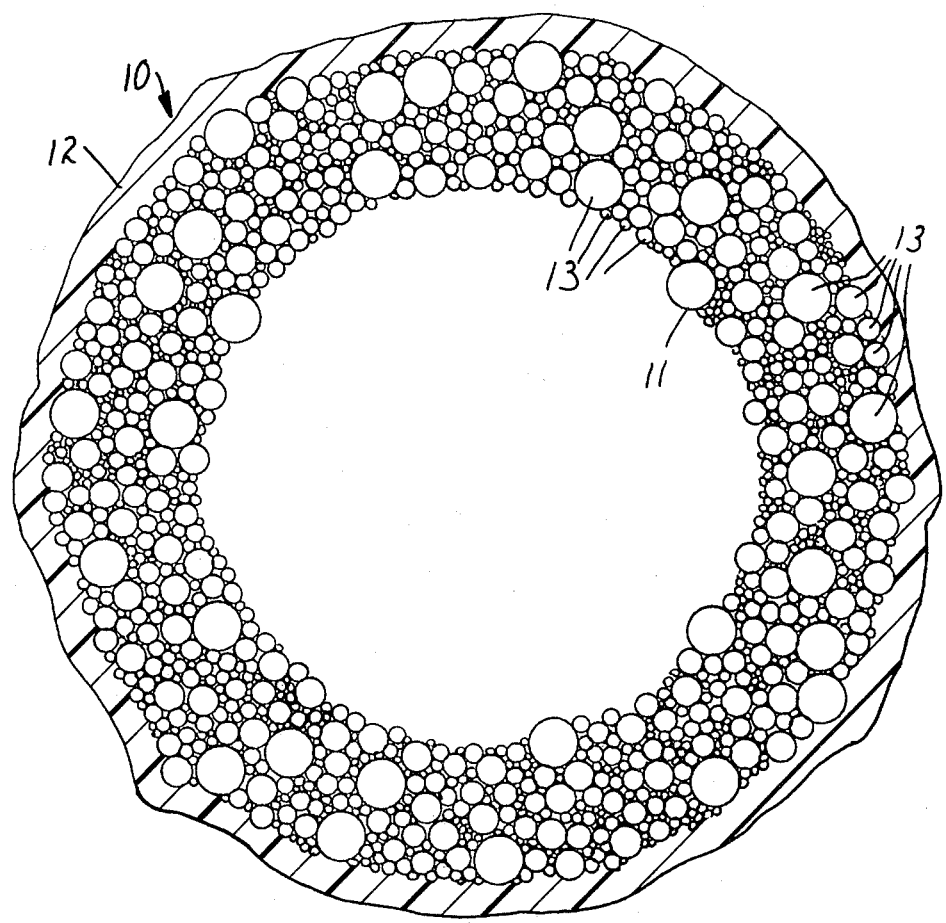
FIG. 1 is a greatly enlarged sectional view through a representative low-permeability sphere of the invention.

FIG. 1 is a sectional view through a representative low-permeability hollow sphere of the invention 10, which comprises a porous core sphere 11 such as taught in my earlier U.S. Pat. No. 4,111,713, coated with a partially sealing layer 12. The illustrative sphere 11 comprises a spherical exterior wall comprising binder material (not pictured) filled with hollow microspheres 13. As described in U.S. Pat. No. 4,111,713, which is incorporated herein by reference, hollow spheres are prepared by tumbling together and thoroughly mixing (1) solidifiable liquid globules of binder material and (2) a mass of minute discrete free-flowing parting agent particles such as hollow glass microspheres. The globules of binder material contain an agent which evolves a gas upon application of heat or other conditions during the tumbling action to form a central interior space within the globules. The parting agent particles are wetted by and at least partially absorbed into the liquid globules during the tumbling action; and sufficient parting agent particles are present so that the globules constantly tumble against discrete unabsorbed parting agent particles. Tumbling is continued until the hollowed liquid globules solidify, as by cooling, reaction, or evaporation of solvent.

The operation is generally performed in a mixing apparatus such as a rotating pan. The solidifiable liquid globules may be formed during the tumbling operation, as by melting granules of solid binder material; or liquids may be used that solidify by reaction or evaporation of solvent.

The solidified hollow spheres generally average between about 0.05 and 2 centimeters in diameter, though for convenient handling and desired permeability they are preferably between 0.2 and 1 centimeter in diameter. The spheres comprise a spherical exterior wall that is at least partially filled, and preferably completely filled, with the parting agent particles. The outer parting agent particles in the sphere will generally be only partially embedded and will partially protrude so as to form the exterior surface of the sphere.

Hollow microspheres are a preferred parting agent particle and form especially lightweight hollow core spheres for use in this invention. U.S. Pat. No. 3,365,315 teaches especially preferred hollow microspheres. Other useful hollow parting agent particles include floated fly ash or hollow phenolic microspheres. Solid particles may comprise at least a portion of the parting agent particles.

The porosity of the core spheres may be controlled by controlling the size of the parting agent particles (large parting agent particles increase porosity) and by controlling the viscosity of the binder material (larger volumes of parting agent particles are taken into a low-viscosity globule and leave the sphere wall more starved of binder material). For certain shallow ocean depths, a desired porosity may be achieved without coating the spheres. However, most often porous spheres are coated with a variety of polymeric-based materials to reduce their porosity or permeability to a desired level. Epoxy resins are a preferred coating material because of their strength, chemical stability and ease of application. Phenolic resins, urea-formaldehyde, urethanes, polyesters, or acrylates are some examples of other polymers that may be used.

The greater the thickness or weight of sealing material applied to the core spheres, the greater the number of pores that are filled. The degree of permeability needed depends upon the ocean level at which a pipe filled with the spheres is to be used. The deeper the pipe is to be used, the greater the pressure that will be exerted forcing water into the spheres, and the lower the permeability needed to achieve the desired slow rate of filling of the spheres. Generally it should take at least a week for the spheres to fill with water at the expected pressure, and the optimal rate of filling is about 10–15 volume-percent per week. The latter rate will cause a pipe of the invention to increase in weight during the first two weeks after deployment underwater about 20 to 30 percent of the amount by which it will ultimately increase in weight. Such an increase permits convenient handling and recovery, if needed, during the initial two-week period.

To allow practical coating procedures it is better to apply thicker sealing coatings in two or more stages so as to avoid agglomerating the spheres. For hollow-microsphere-filled porous spheres described in U.S. Pat. No. 4,111,713, the coating on the spheres is usually between about 20 and 100 micrometers thick to achieve a permeability and compressive strength desired for ocean depths of 1000 feet (300 meters). (Such depths generally apply pressure, and require compressive strengths, of about 500 pounds per square inch (35 kilograms per square centimeter); depths of 500 and 1500 feet (150 and 450 meters) generally apply pressures of 250 and 750 pounds per square inch (17.5 and 52.5 kilograms per square centimeter), respectively.) Two or three coatings are typically used to achieve that thickness.

The sealing materials may vary widely in viscosity. Lower viscosities provide better coverage, but heavier-weight coatings of such materials cannot be applied in as uniform thicknesses. Greater agitation will limit agglomeration with higher-viscosity sealing materials. The preferred viscosity range is about 500 to 5000 centipoises, but viscosities as low as 100 centipoises and as high as 20,000 centipoises have been used.

The coating operation is usually performed in a mixer containing the core spheres and sealing material. Alternatively, as taught in U.S. Pat. No. 4,111,713 (see especially FIG. 5), the spheres may be sprayed with a sealing material while traveling on a conveyor belt and then blown by a jet of air upwardly into a free-falling stream where the sealing material solidifies.

Figure 2:
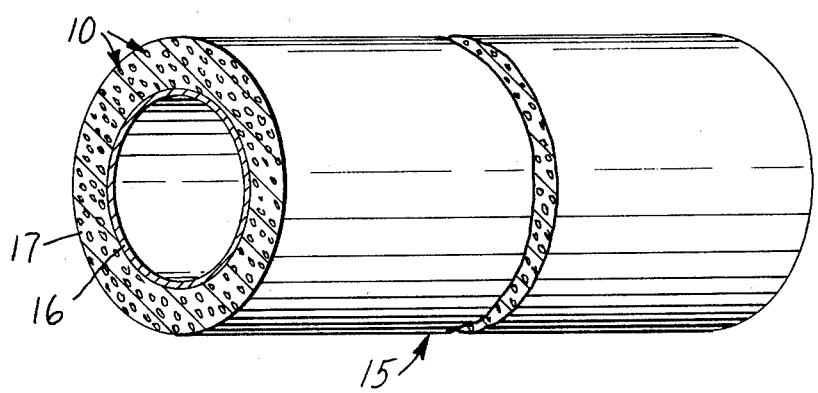
FIG. 2 is a side view partially in section of a length of pipe of the invention.

FIG. 2 shows a typical pipe section 15 of the invention comprising a central pipe 16 covered by a cement shell 17, which is filled with low-permeability spheres. The pipe is typically made by mixing the low-permeability spheres into any desired cement composition, which forms a water-permeable or porous cement structure. The mixture is then applied as a layer around the central pipe. The spheres should be generally inert chemically after being dispersed in the cement.

The cement is filled with sufficient spheres so that the weight of the complete pipe will be about the same as or slightly greater than the specific gravity of sea water. The spheres will generally have a density of no more than about 0.35 gram per cubic centimeter, since a greater density would require that the spheres be mixed into cement in an impractical loading of more than about 50 volume-percent of the mixture to achieve an overall pipe weight equal to the density of water. The most desirable sphere density is about 0.20 gram per cubic centimeter or less, in which case the volume loading can be less than 30 percent.

Figure 3:
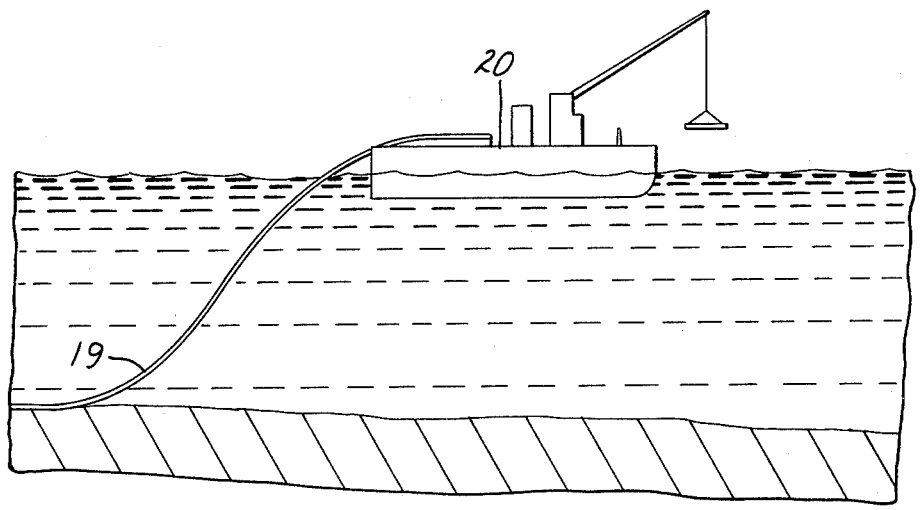
FIG. 3 is a schematic diagram illustrating how pipe of the invention can be laid into a body of water.

Preparation of a pipeline proceeds in the manner shown in FIG. 3. Sections of pipe are added one after the other and the completed portion 19 deployed off a barge 20. The weight of the completed portion causes it to settle into the water and eventually rest on the ocean bottom. However, because of its initially reduced weight, the pipe can be readily lifted to the surface for typically a week or two.

The invention will be further illustrated with the following example.

Porous hollow spheres were prepared using heat-reactive, thermosetting, single-stage 2.4-to-3.4-millimeter-diameter granules of phenolic resin (ammonia-catalyzed condensation product of phenol, o-cresol, and formaldehyde having a mole ratio of between 1 and 1.5 moles of formaldehyde to 1 mole of phenol). The granules were dropped into a 9-inch-diameter (23-centimeter) pan, which contained a bed of 10-to-100-micrometer-diameter hollow glass microspheres. The pan was inclined at an angle of 35°, was rotating about 2 revolutions per second, and was heated from below with a Bunsen burner to a temperature of 250° F. (120° C.). Solidified hollow microspheres formed in about 2 minutes with water serving as a blowing agent. The spheres were approximately 6 to 10 millimeters in diameter.

The shell of the resulting spheres was microporous although it was not penetrated by water at atmospheric pressures. At about 10 pounds per square inch (0.7 kilogram per square centimeter) water pressure, the macrospheres rapidly (i.e., in several minutes) became largely filled with water. Tests with a Beckman Air Comparison Pycnometer show that the macrospheres fill instantly with air which is at about 2 pounds per square inch (0.14 kilogram per square centimeter) pressure.

The porous core spheres were next coated with 2 successive layers of epoxy resin. Three hundred grams of the spheres were placed in a 5-gallon "Mixall" mixer pail and heated to 160° F. with a heat gun, after which 26.7 parts of a mixture (Part A) comprising 94.6 parts of liquid diglycidyl ether of bisphenol A and 5.4 parts of an aliphatic monoglycidyl ether diluent were added to the batch and thoroughly mixed so as to cover all of the spheres. Next 21.3 parts of a mixture (Part B) comprising 48.3 parts of a 75-25 mixture of aminoethyl piperazine and nonyl phenol; 18.9 parts of an amine-terminated adduct of 90 parts modified aliphatic amine and 10 parts diglycidyl ether of bisphenol A; 10.5 parts of an amine-terminated adduct of 65 parts aminoethyl piperazine and 35 parts diglycidyl ether of bisphenol A; 18.9 parts of non-reactive extender resins and pigment; and 3.4 parts of tris (2,4,6-dimethylaminomethyl) phenol were added, and the batch mixed thoroughly until gelation occurred and sufficient curing took place so that the coated spheres were free-flowing. Immediately after mixing, the blend of Part A and Part B had a viscosity of 3600 centipoises at 23° C. A second coat was applied in the same manner but the amounts were reduced to 20.1 parts of Part A and 15.9 parts of Part B.

The density of the coated spheres was 0.20 gram per cubic centimeter, and they exhibited a compressive strength as measured in a hydrostatic press from 500 pounds per square inch to 900 pounds per square inch (35 to 63 kilograms per square centimeter). In a test of the spheres with the Beckman Air Comparison Pycnometer, the pycnometer showed a drift for 27 seconds, meaning that a satisfactory low degree of permeability had been achieved.

The spheres were mixed into a cement that comprised 25 parts Portland cement, 76 parts sand, 38 parts gravel, and 10 parts of water, sufficient spheres being added to account for 30 volume-percent of the mixture. The mixture was then cured and formed as cubes measuring 4 inches (10 centimeters) along an edge and having a density of about 1.15 grams per cubic centimeter. The cement cubes were aged for seven days, immersed in water at ordinary room pressure for one to three days, and then placed under water at a pressure of 500 pounds per square inch (35 kilograms per square centimeter). The internal void-volume of the spheres accounted for about 25 volume-percent of the cubes, and therefore the cubes could ultimately increase in weight during the pressurized water immersion by an amount equal to 25 volume-percent of the cube volume multiplied by the density of water. After being placed under pressure, the cubes increased in weight at an approximately straight-line rate per week of 10–15 percent of the amount by weight they could ultimately increase in weight.

What is claimed is:

1. Reduced-density pipe which absorbs water at a rate that remains substantially unchanged even after storage under moist or wet conditions and which improves the laying of underwater pipeline at great depths by minimizing forces that tend to buckle a pipeline and by permitting retrieval of recently laid pipeline, said pipe comprising a porous cement-based cylindrical shell surrounding a core pipe and filled with hollow spheres that (a) average between 0.05 and 2 centimeters in diameter, (b) have a density of no more than about 0.35 gram per cubic centimeter, and (c) individually comprise (i) a porous hollow core sphere comprising a polymeric binder material and a plurality of solid particles held by the binder material, at least a portion of the thickness of the sphere wall being filled by the particles and the particle-filled sphere wall being permeable such that said core spheres fill instantly with air at a pressure of about 2 pounds per square inch; and (ii) a coating on the exterior surface of the porous hollow core sphere that partially seals the core sphere; said coated spheres exhibiting a stable slow permeability to water such that between about one and ten weeks is required for the spheres to fill with water under an ocean-depth pressure of 10 or more kilograms per square centimeter, whereby the cement shell gradually increases in density when immersed in a body of water at depths that apply such a pressure.

2. Pipe of claim 1 in which said solid particles comprise hollow microspheres.

3. Pipe of claim 1 in which sufficient hollow spheres are included in the cement-based cylindrical shell so that the pipe has a specific gravity about the same as or slightly greater than the specific gravity of sea water.

4. Pipe of claim 1 in which said binder material comprises a phenolic resin.

5. Pipe of claim 2 in which said binder material comprises a phenolic resin.

6. Pipe of claim 3 in which said binder material comprises a phenolic resin.

7. Pipe of claim 1, 2, 3, 4, 5, or 6 in which said coating comprises an epoxy resin.

* * * * *